United States Patent
Gentry (10) Patent No.: US 9,903,952 B2
(45) Date of Patent: Feb. 27, 2018

(54) GPS ERROR CORRECTION VIA NETWORK OF FIXED POINT GROUND STATIONS

(71) Applicant: Amazon Technologies, Inc., Seattle, WA (US)

(72) Inventor: Nicholas Kristofer Gentry, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 211 days.

(21) Appl. No.: 14/661,843

(22) Filed: Mar. 18, 2015

(65) Prior Publication Data

US 2016/0274241 A1 Sep. 22, 2016

(51) Int. Cl.
- *G01S 19/03* (2010.01)
- *G01C 21/00* (2006.01)
- *G01S 19/07* (2010.01)
- *G01S 19/41* (2010.01)

(52) U.S. Cl.
CPC .............. *G01S 19/03* (2013.01); *G01C 21/00* (2013.01); *G01S 19/07* (2013.01); *G01S 19/41* (2013.01)

(58) Field of Classification Search
None
See application file for complete search history.

(56) References Cited

U.S. PATENT DOCUMENTS

| | | | | |
|---|---|---|---|---|
| 5,477,458 A * | 12/1995 | Loomis | ................... | G01S 19/04 342/357.48 |
| 5,495,257 A | 2/1996 | Loomis | | |
| 5,675,081 A * | 10/1997 | Solheim | ................... | G01W 1/00 324/640 |
| 6,014,101 A * | 1/2000 | Loomis | ................... | G01S 5/009 342/357.22 |
| 6,035,710 A * | 3/2000 | Hutchison | ................ | G01W 1/08 702/3 |
| 6,529,830 B1 * | 3/2003 | Eschenbach | ............ | G01S 19/07 342/357.24 |

(Continued)

FOREIGN PATENT DOCUMENTS

KR          101472392          12/2014

OTHER PUBLICATIONS

Cosentino, et al., "Differential GPS", In: Kaplan Elliot D. and Hegarty Christopher J. "Understanding GPS: Principles and Applications, Second Edition", Jan. 1, 2005, Artech House, pp. 379-397

(Continued)

*Primary Examiner* — Todd Melton
*Assistant Examiner* — Jason R Roberson
(74) *Attorney, Agent, or Firm* — Lee & Hayes, PLLC (57) ABSTRACT

An error correcting location system includes a ground station with fixed reference coordinates. The ground station may receive satellite broadcast messages from a plurality of location system satellites. Further, the ground station may determine location coordinates based on the satellite broadcast messages, and compare the location coordinates to the fixed reference coordinates to determine a compensation value. In addition, the ground station may send the compensation value to location system devices. Upon receipt of the compensation value, the location system devices may utilize the compensation value to generate highly accurate location coordinates.

20 Claims, 5 Drawing Sheets

(56) References Cited

U.S. PATENT DOCUMENTS 7,089,452 B2 *  8/2006  Rubin .................... G01S 19/08
                                                   342/357.29

OTHER PUBLICATIONS

Lapuca, et al, "Multisite Real-Time DGPS System Using Satellite Data Line Operational Results", Natigation, Institute Navigation, Fairfax, VA, USA, vol. 40, No. 3, Dec. 1, 1993, pp. 283-296.
Manning, et al., "Detecting Weather using GPS Tomography: An Australian Case Study", Journal of Global Positions Systems, vol. 11, No. 1, pp. 58-70.
The PCT Search Report dated Jun. 14, 2106 for PCT application No. PCT/US2016/021443, 18 pages.
Sparks, et al., "Extreme Ionospheric Storms and Their Impact on WAAS", Ionospheric Effects Symposium 2005, May 3-5, 2005, Alexandria, VA, USA, May 1, 2005, retrieved from the internet at URL:http://hdl.handle.net/2014/37807 on Jun. 1, 2016.

* cited by examiner

COMPARE FIRST LOCATION COMPENSATION VALUES TO HISTORICAL COMPENSATION DATA ASSOCIATED WITH THE FIRST GROUND STATION
502

DETERMINE THE OCCURRENCE OF AN ERROR-CAUSING EVENT IN A GEOGRAPHIC AREA ASSOCIATED WITH THE FIRST GROUND STATION BASED AT LEAST IN PART ON THE COMPARISON BETWEEN THE FIRST LOCATION COMPENSATION VALUES AND THE HISTORICAL COMPENSATION DATA
504

MODIFY A NAVIGATION PATH BASED AT LEAST IN PART ON THE ERROR-CAUSING EVENT
506

FIG. 5

GPS ERROR CORRECTION VIA NETWORK OF FIXED POINT GROUND STATIONS

BACKGROUND

The use of conventional satellite location systems, such as the Global Positioning System ("GPS"), has become commonplace for a wide variety of applications, such as navigation, object tracking and surveying. However, due to various sources of error, the preciseness of conventional satellite location systems is currently insufficient for applications requiring highly accurate positional information. For example, autonomous vehicles and unmanned aerial vehicle (UAV) applications require greater position accuracy than currently available.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure includes, in part, techniques and systems for increasing position accuracy within a satellite location system. The present disclosure describes a location system ground station with fixed coordinates that may receive satellite broadcast messages from a plurality of location system satellites. In response, the ground station may determine location system coordinates based on the satellite broadcast messages, and compare the location system coordinates to the fixed coordinates to generate a compensation value. Further, the ground station may broadcast compensation information including the compensation value to location system devices. As used herein, a location system device may include any device that includes a location system communication interface (e.g., a global positioning system (GPS) receiver). Some examples of location system devices may include navigation devices, unmanned aerial vehicles (UAV), autonomous vehicles, smart phones, mobile devices, etc. Upon receipt of the compensation information, the location system device may use the compensation value to correct errors that occur when computing the location system coordinates based on the satellite broadcast messages. As used herein, coordinates may include multi-dimensional coordinates with a predetermined origin. For example, the coordinates may include three-dimension Cartesian coordinates with origin at the Earth's centers. In another example, the coordinates may include latitude, longitude and altitude.

In some examples, the location system may be implemented as a GPS system. For example, the location system satellites may include GPS satellites, and the location system device may include any device with a GPS receiver. Further, the ground stations and location system devices may determine their respective location system coordinates based at least in part on signals broadcasted from the GPS satellites in accordance with well-known GPS techniques. Alternatively, the person having ordinary skill in the art will understand that the techniques and systems described may be applied also to other satellite positioning systems, which are known generally as Global Navigation Satellite Systems.

In some embodiments, the ground station may determine the compensation value by computing the difference between the location system coordinates and the fixed coordinates. The compensation information may further include an identifier of the ground station, a location of the ground station, the date and time of calculation of the compensation value, and identifiers of the location system satellites associated with the satellites broadcast messages used to determine the location system coordinates.

In various embodiments, the ground station may determine which group of satellite broadcast messages minimizes the compensation value. Further, the ground station may send compensation information including the minimized compensation value and identifiers of the location system satellites associated with the group of satellite broadcast messages that minimized the compensation value.

In some examples, the compensation information may include a plurality of compensation values each mapped to the group of location system satellites used to determine the respective compensation value. In some other examples, the ground station may determine confidence values representing the positional accuracy and/or reliability of location system satellites based at least in part on the compensation values associated with the location system satellites.

In some embodiments, the ground station may determine the occurrence of an error-causing event based at least in part on the compensation values. For example, the ground station may identify at least one of a weather event, natural/artificial interference within the location system, and/or satellite clock drift based at least in part on a relationship between the compensation value and historical compensation values. Further, the ground station may send an indication of the event to a location system device or location system server.

In various embodiments, the ground station may encrypt the compensation information prior to transmitting the compensation information to a location system device. Further, the ground station may transmit compensation information with a message authentication code that may be used by a recipient to verify the integrity of the compensation information. In some examples, the ground stations may broadcast compensation on different frequencies that can be used by a location system device to identify the sender.

In some embodiments, the location system device may identify the location system satellites that correspond to a compensation value included in the compensation information. For instance, the location system device may identify the location system satellites that correspond to a compensation value based at least in part on satellite identifiers included in the compensation information. Further, the location system device may determine its location system coordinates based at least in part on satellite broadcast messages associated with the identified location system satellites. In addition, the location system device may modify the location system coordinates by the compensation value. For example, the location system device may adjust the location system coordinates by the compensation value to produce corrected location system coordinates.

In some examples, the location system device may compute corrected location system coordinates based at least in part on an average of a plurality of compensation values received from a plurality of ground stations. For instance, the location system device may modify the location system coordinates by an average of a plurality of compensation values received from a plurality of ground stations. In some cases, the location system device may weigh the compensation values differently based at least in part on the proximity of the ground stations to the location system device, the age of the compensation value (i.e., the date and time of calculation of the compensation value), confidence values associated with ground stations, and/or confidence values associated with location system satellites. For example, the location system device may weight a first compensation value more heavily than a second compensation value when the first compensation value was calculated more recently than the second compensation value.

In some examples, the location system device may compute a plurality of corrected location system coordinates based at least in part on compensation information received from a plurality of ground stations. Further, the location system device may average the plurality of corrected location system coordinates to determine averaged corrected location system coordinates. In some cases, the location system device may weigh the corrected location system coordinates differently based at least in part on the proximity of the ground stations to the location system device, the age of the compensation information (e.g., the date and time of calculation of the compensation value, time of arrival, time of transmission, etc), confidence values associated with ground stations, and/or confidence values associated with location system satellites. For example, the location system device may weight corrected location system coordinates associated with a ground station in close proximity to the location system device more heavily than ground stations that are not located in close proximity to the ground station.

In various embodiments, the location system device may receive a plurality of compensation values from a ground station. Accordingly, the location system device may determine which compensation values are associated with satellite broadcast messages the location system device may access. For example, the location system device may be unable to receive satellite broadcast messages from one or more of the location system satellites when the one or more satellites are not in view of the location system device. Therefore, the location system device may identify the group of system location satellites for which the location system has received satellite broadcast messages, and use a compensation value associated with the identified group of location system satellites. In some other examples, the location system device may determine its location system coordinates using a group of location system satellites for which the location system device has most recently received a compensation value and/or a group of location system satellites associated with compensation value having the most recent date and time of calculation.

In some embodiments, the location system device may combine or average corrected location system coordinates with location system coordinates that have not been corrected using compensation values. Further, the location system device may weight differently the corrected location system coordinates and the non-corrected location system coordinates.

In various embodiments, the location system device may determine confidence values for individual location system satellites based at least in part on historical compensation values. Additionally, and alternatively, the location system device may receive confidence values for the location system satellites from the ground stations and/or a location system server. Further, the location system device may determine which location system satellites to use for computing its location system coordinates based at least in part on the confidence values. For example, the mobile device may exclude one or more location system satellites with confidence values below a predetermined threshold when determining its location system coordinates.

In some embodiments, the location system device may determine confidence values for individual ground stations based at least in part on historical compensation values. Further, the location system device may determine which compensation values to use for computing its location system coordinates based at least in part on the confidence values. For example, the location system device may utilize a first compensation value received from a first ground station instead of a second compensation value received from a second ground station based at least in part on a confidence value associated with the first ground station being higher than a confidence value associated with the second ground station.

In various embodiments, the location system device may employ Kalman filtering (i.e., linear quadratic estimation) to verify the accuracy of corrected location system coordinates. For example, the location system device may determine expected location system coordinates based on historical data and/or a predetermined navigation path. Further, the location system device may use Kalman filtering to compare the corrected location system coordinates to an expected location system coordinates in order to verify the corrected location system coordinates.

In some examples, the mobile device may determine the occurrence of an error-causing event based at least in part on a compensation value. Additionally, and alternatively, the location system device may receive an indication of an error-causing event from one or more ground stations. Further, the location system device may modify a predetermined navigation path based at least in part on the occurrence of the event. For example, the location system device may determine that an extreme weather event is occurring in a geographic area along its flight path. As a result, the mobile device may modify its flight path to avoid flying in the geographic area.

Figure 1:
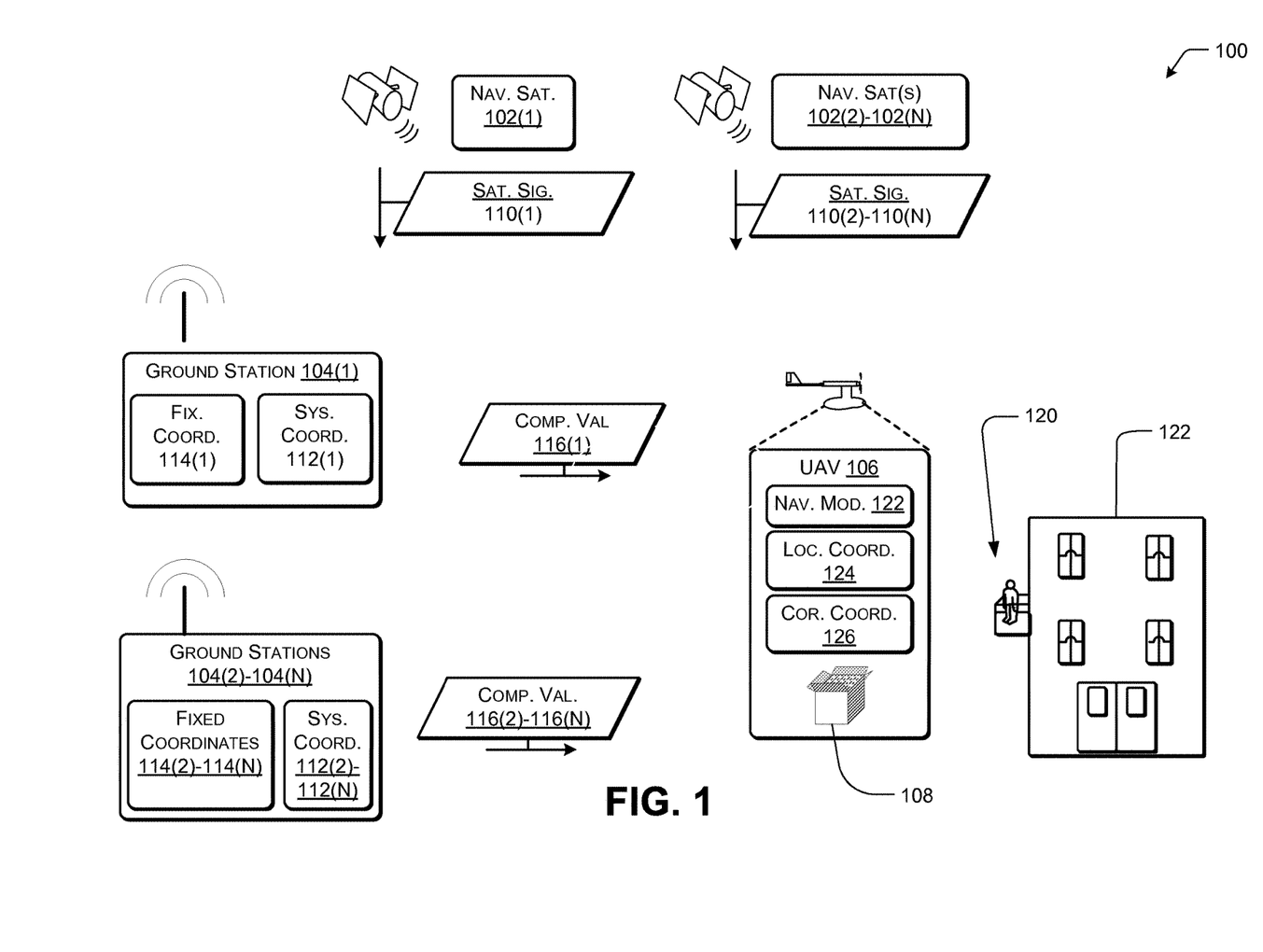
FIG. 1 illustrates an example framework for providing accurate location system coordinates to an unmanned aerial vehicle (UAV) within a satellite location system, according to some implementations.

FIG. 1 illustrates an example framework 100 for providing accurate location system coordinates to a UAV within a satellite location system, according to some implementations. FIG. 1 shows illustrative interactions within a location system environment between one or more satellites 102, one or more ground stations 104, and a UAV 106 when performing various operations, including providing navigation assistance to the UAV 106 while it performs delivery of a delivery package 108.

As shown in FIG. 1, the satellites 102 may broadcast satellite signals 110 to the ground stations 104 and the UAV 106. For instance, in a GPS implementation of the location system, the satellite signals 110 may include a pseudorandom code that identifies the satellite, and a message including the time of transmission associated with the pseudorandom code and the current position of the satellite. Each satellite signal 110 may be associated with a respective satellite 102. For example, a first satellite 102(1) may broadcast satellite signal 110(1). Further, other satellites 102(N) may broadcast other satellite signals 110(N). Additionally, and alternatively, the ground stations 104 and the UAV 106 may receive the satellite signals 110 in response to a satellite signal request.

In the illustrative example of FIG. 1, each ground station 104 may receive a plurality of satellite signals 110 from the satellites 102, and use the contents of the satellite signals 110 to determine its respective location system coordinates 112. For example, in a GPS system the ground station 104(1) may receive broadcast signals 110(1), 110(2), 110(3), and 110(4) from satellites 104(1), 104(2), 104(3), and 104(4), respectively. Further, the ground station 104(1) may process the broadcast signals 110(1), 110(2), 110(3), and 110(4) to determine its location system coordinates 112(1). Each ground station may periodically compute its location system coordinates 112 based upon broadcast signals 110 received from the satellites 102. For example, each of the other satellites 102(2)-102(N) may compute its respective location system coordinates 112(2)-112(N) based at least in part on the broadcast signals 110.

Once a ground station 104 computes its location system coordinates 112, the ground station 104 may compare the location system coordinates 112 to fixed location coordinates 114 associated with the ground station 104 to determine a compensation value 116. For example, the ground station 104 may compute the difference between the location system coordinates 112 and the fixed coordinates 114 to determine the compensation value 116. In addition, the ground station 104 may send the compensation value 116 to the UAV 106. Each ground station 104 may be associated with fixed location coordinates 114. For instance, a first ground station 104-1 may be associated with fixed location coordinates 114-1. Further, other ground stations 104(N) may be associated with other fixed coordinates 114(N).

In the illustrative example of FIG. 1, suppose the UAV 106 is delivering the delivery package 108 to a customer 118 at a customer address environment 120. The UAV 106 may include a navigation module 122 that determines the flight path of the UAV 106 based at least in part on the current location of the UAV 106. For instance, the navigation module 122 may determine that the UAV has arrived at the customer address environment 120 and instruct the UAV 106 to drop off the delivery package 108. Accordingly, the UAV 106 may receive compensation values 116 from the ground stations 104, and use the compensation values 116 to correct errors contained in location system coordinates 124 computed by the UAV 106. In some examples, the sources of errors may include signal arrival time measurements, numerical calculation, atmospheric effects (e.g., ionospheric induced propagation delay, tropospheric refraction, etc.), clock data and ephemeris, multipath signals, natural interference, and artificial interference.

For example, the UAV 106 may receive broadcast signals 110(1), 110(2), 110(3), and 110(4) from satellites 102(1), 102(2), 102(3), and 102(4), respectively. Further, the UAV 106 may process the broadcast signals 110(1), 110(2), 110(3), and 110(4) determine its location system coordinates 124. Once the UAV 106 has determined the location system coordinates 124, the UAV 106 may correct the location system coordinates 124 with at least one of the compensation values 116 to generate corrected location system coordinates 126. Following, the navigation system 122 may rely on the corrected location system coordinates 126 to drop off the delivery package 108 at the customer address environment 120 with increased positional accuracy, thus reducing the probability of theft and/or loss of the delivery package 108.

Figure 2:
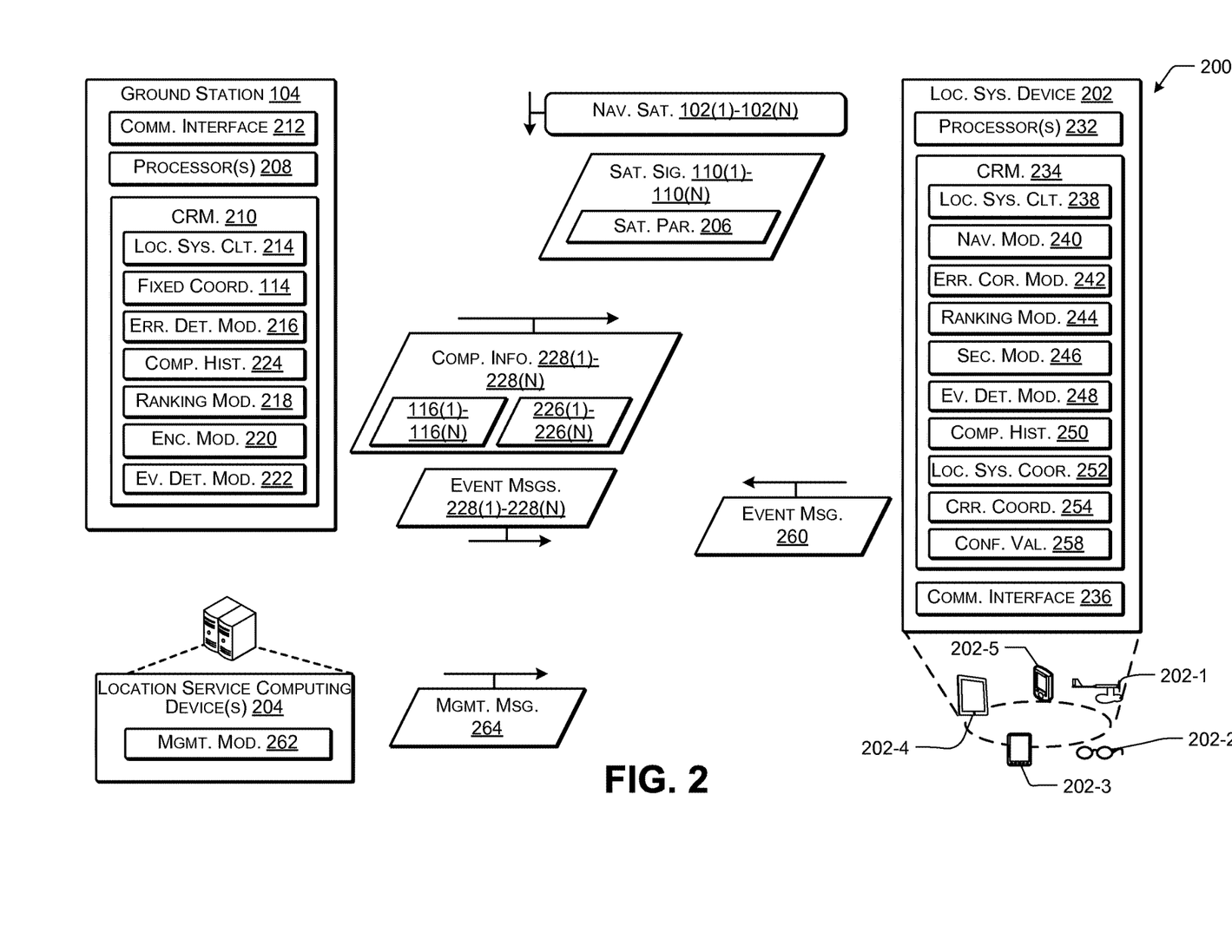
FIG. 2 illustrates an example framework for providing accurate location system coordinates within a satellite location system, according to some implementations.

FIG. 2 illustrates an example framework 200 for providing accurate location system coordinates within a satellite location system, according to some implementations. FIG. 2 shows illustrative interactions between the navigation satellites 102, the ground stations 104, a location system device 202, and a location system server 204 when performing various operations, including correcting errors in calculated location system coordinates. Some common examples of the location system device 202 may include vehicles 202(1), wearable electronic devices 202(2), digital media devices and eBook readers 202(3); tablet computing devices 202(4); and smart phones and mobile devices 202(5). For instance, the location system device 202 may include a vehicle navigation device, another portable device, such as a mobile phone, a smart phone, a media player, a portable gaming device, a laptop computer, or other typically handheld devices that are easily passed between users. Further, in some examples herein, the location system device 202 may be a wearable device or a device that is otherwise transported by a user, such as headphones, a helmet, augmented reality glasses, an article of clothing, a device retained in an armband or supported on a belt, a watch, a bracelet, an anklet, or any other portable or mobile electronic device having components capable of performing the recognition functions described herein, and that may be moved by, carried by, worn by, or supported by a person.

As shown in FIG. 2, the navigation satellite 102 may broadcast the satellite signal 110. In some examples, the satellite signal 110 may include satellite parameters 206. For instance, in a GPS implementation, the satellite parameters 206 may include a pseudorandom code that identifies the satellite, and a message including the time of transmission associated with the pseudorandom code and the current position of the satellite.

In the illustrative example of FIG. 2, the ground station 104 includes one or more processors 208, one or more computer readable media 210, and a location system communication interface 212. Each processor 208 may itself comprise one or more processors or processing cores. As described herein, a processor can be implemented as one or more microprocessors, microcomputers, microcontrollers, digital signal processors, central processing units, state machines, logic circuitries, and/or any devices that manipulate signals based on operational instructions. Further, a processor may be one or more hardware processors and/or logic circuits of any suitable type specifically programmed or configured to execute the algorithms and processes described herein. The processor 208 can be configured to fetch and execute computer-readable processor-executable instructions stored in the computer-readable media 210.

The computer-readable media 210 may include volatile and nonvolatile memory and/or removable and non-removable media implemented in any type of technology for storage of information, such as computer-readable instructions, data structures, program modules, or other data. As described herein, computer-readable media may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Further, the computer-readable media 210 may be used to store and maintain any number of functional components that are executable by the processor 208. In some implementations, these functional components comprise instructions or programs that are executable by the processor 208 and that, when executed, implement operational logic for performing the actions attributed to the ground station 104. Functional components of the ground station stored in the computer-readable media may include a location system client 214, an error detection module 216, a ranking module 218, a fixed coordinates management module 219, an encryption module 220, and an event determination 222 module. In addition, the computer-readable media 210 may also store data, data structures and the like, that are used by the functional components. For example, the computer readable media 210 may include the fixed coordinates 114 and compensation history 224. Further, the ground station may include many other logical, programmatic, and physical components, of which those described are merely examples that are related to the discussion herein.

The communication interface(s) 212 may include one or more interfaces and hardware components for enabling communication with various other devices, such as over a network(s) or directly. For example, communication interface(s) 212 may enable communication through one or more of wireless communication platforms (e.g., Global System for Mobile Communications, Code Division Multiple Access, Time Division Multiple Access, Advanced Mobile Phone System, etc), the Internet, cable networks, cellular networks, wireless networks (e.g., Wi-Fi) and wired networks, and the like, as additionally enumerated elsewhere herein.

In some examples, the ground station 104 may receive broadcast signals 110(1)-110(4) from satellites 102(1)-102(4), respectively. Further, the location system client 214 may process the broadcast signals 110(1)-110(4) to determine the location system coordinates 112 of the ground station 104. In addition, the location system client 214 may store the location system coordinates 112, the set of satellites 102 that provided the satellite parameters 206 used to determine the location system coordinates 112, and/or temporal information associated with the arrival of the satellites signals 110 or computation of the location system coordinates 112 in the compensation history 224.

In some examples, the location system client 214 may compute location system coordinates 112 for different sets of satellites 102. For instance, the communication interface 212 may receive satellite signals 110(1)-110(5), from satellites 102(1)-102(5). Therefore, the location system client 214 may compute a plurality of location system coordinates 112 for different combinations of the received satellite signals 110. In some examples, the location system client 214 may require more than a predetermined number of satellite signals 110 to compute location system coordinates 112. For instance, in a GPS implementation the location system client 214 may require that at least four satellite signals 110 from four different satellites 102 be used to compute the location system coordinates 112.

Once the location system client 214 computes the location system coordinates 112, the error detection module 216 may compare the location system coordinates 112 to the fixed location coordinates 114 associated with the ground station 104 to detect the presence of error and determine the compensation value 116 for correcting the error. For example, the ground station 104 may compute the difference between the location system coordinates 112 and the fixed coordinates 114 to determine the compensation value 116. Further, the error detection module 216 may associate the compensation value 116 with related information in the compensation history 224. For example, the error detection module 216 may store, to the compensation history 224, a mapping of the compensation value 116 to the set of satellites 102 that provided the satellites signals 110 used to determine the compensation value 116.

In some examples, the location may compute a plurality of location system coordinates 112 based at least in part on different combinations of the received satellite signals 110. For example, the error detection module 216 may produce compensation values 116 corresponding to the different combinations of the received satellite signals 110. For example, the error detection module 216 may determine a compensation value 116 corresponding to a group of satellites consisting of 102(1)-102(5), and another compensation value 116 corresponding to another group of satellites consisting of 102(2)-102(5).

In some examples, the ranking module 218 may compare the plurality of compensation values 116 to determine which set of satellites 102 is the most accurate based at least in part on the set of satellites 102 having the smallest compensation value 116. For example, the ranking module 218 may determine that the compensation value 116 for a group of satellites consisting of 102(1)-102(4) is lesser than any other computed compensation value 116.

In some examples, the fixed coordinates management module 219 may detect movement of the ground station 104. Further, in response to the detected movement, the fixed coordinates management module 219 may update the fixed location coordinates 114 of the ground station 104. For example, the fixed location management module 219 may include accelerometers and/or other hardware that detects movement, which may indicate that the fixed location coordinates 114 need updating (e.g., due to a possible occurrence of movement of the ground station 104, etc.).

In some instances, the ground station 104 may suspend the broadcast of compensation information 228 while the ground station 104 is moving. In some other instances, the ground station 104 may suspend the computation of compensation information 228 while the ground station is moving. In yet still another instance, the fixed coordinates management module 219 may determine a distance the ground station 104 has moved, and update the fixed location coordinates 114 accordingly in near-real time.

In some examples, the ranking module 218 may determine confidence values 226 for the location system satellites 102 based at least in part on compensation values 116. For instance, a location system satellite 102 may receive a lower confidence value 226 relative to other satellites 102 if the satellite 102 is associated with one or more groups of satellites 102 having large compensation values 116. In some other examples, the ranking module 218 may utilize regression analysis (e.g., linear regression, etc) to determine which individual satellites 102 correspond to the least favorable compensation values 116. Further, a satellite 102 may receive a lower confidence value relative to other satellites 102 if the error detection module 218 determines that the satellites signal 110 of the satellite 102 significantly contributes to compensation values 116.

The ground station may send compensation information 228 to the location system device 202. The compensation information 228 may include the one or more compensation values 116. For each compensation value 116, the compensation information 228 may further include an identifier of the ground station, a location of the ground station 104, the date and time of calculation of the compensation value 116, a time of transmission of the compensation information 228, and identifiers of the location system satellites 102 associated with the compensation value 116. Further, the compensation information 228 may include the confidence values 226 determined by the rankings module 218.

In addition, the encryption module 220 may perform a cryptographic function on the contents of the compensation information 228. Example cryptographic functions may include cryptographic hash functions (e.g., message digest algorithm ("MD5"), secure hash algorithm-1 ("SHA-1"), secure hash algorithm-2 ("SHA-2"), secure hash algorithm (3) ("SHA(3)"), etc.), one-way functions, public private key encryption functions, symmetric key encryption, etc. For example, the encryption module 220 may encrypt the compensation value 116 using a ground station encryption key. In some other examples, the encryption module 220 may generate a keyed-hash message authentication code ("HMAC") based on the compensation value and a salt value (e.g., nonce).

In some examples, the event determination 222 module may determine the occurrence of an error-causing event based at least in part on the compensation values 116. For instance, the event determination 222 module may identify at least one of a weather event, natural/artificial interference within the location system, and/or satellite clock drift based at least in part on a relationship between the compensation value 116 and historical compensation values in the compensation history 224. In some examples, the event determination module 248 may employ machine learning techniques to identify error-causing events. Further, the ground station 104 may send an event information message 230 to the location system device 202 or the location system server 204 via the communication interface 212. The event information message 230 may identify the ground station 104 and indicate the occurrence of the detected event.

In the illustrative example of FIG. 2, the location system device 202 includes one or more processors 232, one or more computer readable media 234, and a location system communication interface 236. Each processor 232 may itself comprise one or more processors or processing cores. Further, the computer-readable media 234 may be used to store and maintain any number of functional components that are executable by the processor 232. In some implementations, these functional components comprise instructions or programs that are executable by the processor and that, when executed, implement operational logic for performing the actions attributed to the location system device 202. Functional components of the location system device 202 stored in the computer-readable media 234 may include a location system client 238, a navigation module 240, an error correction module 242, a ranking module 244, security module 246, and an event determination module 248. In addition, the computer-readable media 234 may also store data, data structures and the like, that are used by the functional components. For example, the computer readable media 234 may include compensation history 250, location system coordinates 252, and corrected location system coordinates. Further, the location system device 202 may include many other logical, programmatic, and physical components, of which those described are merely examples that are related to the discussion herein.

The communication interface(s) 236 may include one or more interfaces and hardware components for enabling communication with various other devices, such as over the network(s) or directly. For example, communication interface(s) 236 may enable communication through one or more of wireless communication platforms (e.g., Global System for Mobile Communications, Code Division Multiple Access, Time Division Multiple Access, Advanced Mobile Phone System, etc), the Internet, cable networks, cellular networks, wireless networks (e.g., Wi-Fi) and wired networks, and the like, as additionally enumerated elsewhere herein. In some instances, the communication interface 236 may have similar or identical technical capabilities as the communication interface 212. For example, the communication interface 236 and communication interface 212 may share a similar specification, model, manufacturer, and/or type.

Upon receipt of the compensation information 228, the location system client 238 may select a compensation value 116 from the compensation value, and compute location system coordinates 250 using the same location system satellites 102 used by the ground station 104(1) to determine the compensation value 116. Further, the error correction module 242 may use the location system coordinates 252 and the compensation value 116 to determine corrected location system coordinates 254.

In some examples, the location system client 238 may select a compensation value 116 based at least in part one or more predetermined factors. For instance, the location system client 238 may select the compensation value 116 based at least in part on the satellites 102 and/or ground station 104 associated with the compensation value 116. In some other instances, the location system client 238 may select the compensation value 116 based at least in part on confidence values 226 and/or compensation history 250 associated with the satellites 102 associated with the compensation value 116. For example, the location system client 238 may exclude one or more location system satellites 102 with confidence values 226 below a predetermined threshold when determining its location system coordinates 252.

Additionally, and alternatively, the location system client 238 may determine location system coordinates 252 based at least in part on the satellite signals 110 received by the communication interface 236. For example, the error correction module 242 may identify the set of satellites 102 associated with the satellite signals 110 received by the communication interface 236, and identify a compensation value 116 mapped to the identified set of satellites 102. In addition, the error correction module 242 may use the location system coordinates 252 and the identified compensation value 116 to determine corrected location system coordinates 254.

The location system device 202 may receive compensation information 228(1), 228 (2), . . . , and 228 (N) from a plurality of ground stations 104(1), 104(2), . . . , and 104(N). In some examples, the location system device 202 may select compensation values 116 of the received compensation information 228 to use for error correction based at least in part on the proximity of the ground stations 104 and/or compensation history 250 associated with the ground stations 104. Further, the error correction module 242 may average the selected compensation values 116 to determine an average compensation value. Further, the error correction module 242 may use the location system coordinates 252 and the average compensation value to determine corrected location system coordinates 254. In some instances, the error correction module 242 may weigh the compensation values 116 based at least in part on the compensation information 228, and compensation history 250 related to the satellites 102 and/or ground station 104 associated with the compensation values 116. For example, the error correction module 242 may weigh the compensation values 116 based at least in part on the age of the compensation history 250 (e.g., for decaying values over time, etc.), the proximity of the ground station 104 that determined the compensation value 116 to the location system device 202, and/or confidence values 226 associated with the satellites 102 and/or ground station 104 associated with the respective compensation value 116.

In yet another example, the location system device 202 may use the location system client 238 and the error correction module 242 to produce a plurality of corrected location system coordinates 254. Further, the error correction module 242 may average the plurality of corrected location system coordinates 254 to determine averaged corrected location system coordinates. In some instances, the error correction module 242 may weigh the corrected location system coordinates 254 based at least in part on information related with the satellites 102 and/or ground station 104 associated with the respective corrected location system coordinates 254. For example, the error correction module 242 may weight corrected location system coordinates 254 based at least in part on the age of the compensation history 250, the proximity of the ground station 104 that determined the compensation value 116 to the location system device 202, and/or confidence values 226 associated with the satellites 102 and/or ground station 104 associated with the respective compensation value 116.

Additionally, the location system device 202 may average corrected location system coordinates 254 with location system coordinates 252 that have not been corrected using compensation values 116. Further, the error correction module 242 may weight differently the corrected location system coordinates 254 and the location system coordinates 252 that have not been corrected using compensation values 116.

In some examples, the error correction module 242 may utilize Kalman filtering to evaluate the corrected location system coordinates 254. For instance, the error correction module 242 may compare the corrected location system coordinates 254 to expected location system coordinates. In some examples, the expected location system coordinates may be based at least in part on the compensation history 250 and/or other historical data associated with the location system device 202. If the Kalman filter determines that the corrected location system 254 coordinates are invalid, the location system device 202 may re-compute the location system coordinates 254 using different satellites 102, ground stations 104 and/or compensation values 116.

The ranking module 244 may determine confidence values 258 for satellites 102 and/or ground stations 104 based at least in part on the compensation information 228 and the compensation history 250. For instance, the ranking module 244 may determine confidence values 258 for the satellites 102 based at least in part on determining whether a satellite 102 is associated with less favorable compensation values 116. In some other instances, the ranking module 244 may determine confidence values 258 for the ground stations 104 based at least in part on an measuring the consistency of compensation values 116 received from the ground stations 104. For example, a confidence value 250 may be based on the deviation of a compensation value 116 with reference to other compensation values 116 computed by different ground stations 104 for the same set of satellites. In another example, the confidence value 250 may be based on the deviation of a compensation value 116 with reference to other compensation values 116 computed by the same ground station 104 for the same set of satellites 102.

Further, the ranking module 244 may include a trained statistical model that is initially trained using compensation history 250. In addition, the ranking module 244 may periodically update and re-train the statistical model based on new training data to keep the model up to date. For instance, the ranking module 244 may employ machine learning techniques to continuously train the statistical model as compensation history 250 is collected. Additionally, and alternatively, the ranking module 244 may receive confidence values 226 for the location system satellites 102 from the ground stations 104 and/or the location system server 204.

In some examples, the compensation information 228 may be encrypted. Following, the security module 246 may decrypt the compensation information 228 in accordance with well known decryption techniques. In some cases, the compensation information 228 may include a message authentication code. Upon receipt of a message authentication code, the security module 246 may verify the authenticity of the compensation information 228 before relying on the compensation values 116 or confidence values 226 included in the compensation information 228.

The event determination module 248 may determine the occurrence of an error-causing event based at least in part on the compensation values 116. For instance, the event determination module 248 may identify at least one of a weather event, natural/artificial interference within the location system, and/or satellite 102 clock drift based at least in part on a relationship between the compensation value 116 and historical compensation values collected in the compensation history 250. In some examples, the event determination module 248 may employ machine learning techniques to identify error-causing events.

In addition, the location system device 202 may indicate the occurrence of the event to a user and/or operator of the location system device 202. In some other examples, the navigation module 240 may modify a navigation path of the location system device 202 based at least in part on the event. Further, the location system device 202 may send an event information message 260 to the location system server 204 via the communication interface 236. The event information message 260 may identify the location system device 202 and indicate the occurrence of the detected event.

In the illustrative example of FIG. 2, the location system server 204 may include a management module 262. The management module 262 may manage the satellites 102, the ground stations 104, and the location system device 202. In some examples, the management module 262 may receive the compensation information 228, event information messages 230, and/or event information messages 260. Further, the management module 262 may send management messages 254 to the ground stations 104, and the location system device 202 based at least in part on compensation information 228, event information messages 230, and/or event information messages 260.

For instance, the management module 262 may send a management message 264 to the navigation module 240 to modify a navigation path. In some other instances, the management messages 254 may include confidence values 258 determined based on an aggregation of confidence values 226 and confidence values 258 generated by the ground stations 104 and/or location system devices 202. In yet another instance, the management module 262 may send a management message 264 instructing a ground station 104 to recalibrate or reconfigure itself based at least in part on compensation values 116, confidence values 258 associated with the ground station 104, event messages 228 that are associated with ground station 104, and/or event messages 260 from the location system device 202 associated with the ground station 104. Additionally, the location system server 204 may be able to remotely perform error detection, error correction, and ranking functions as described herein with respect to the ground stations 104 and the location system devices 202.

Figure 3:
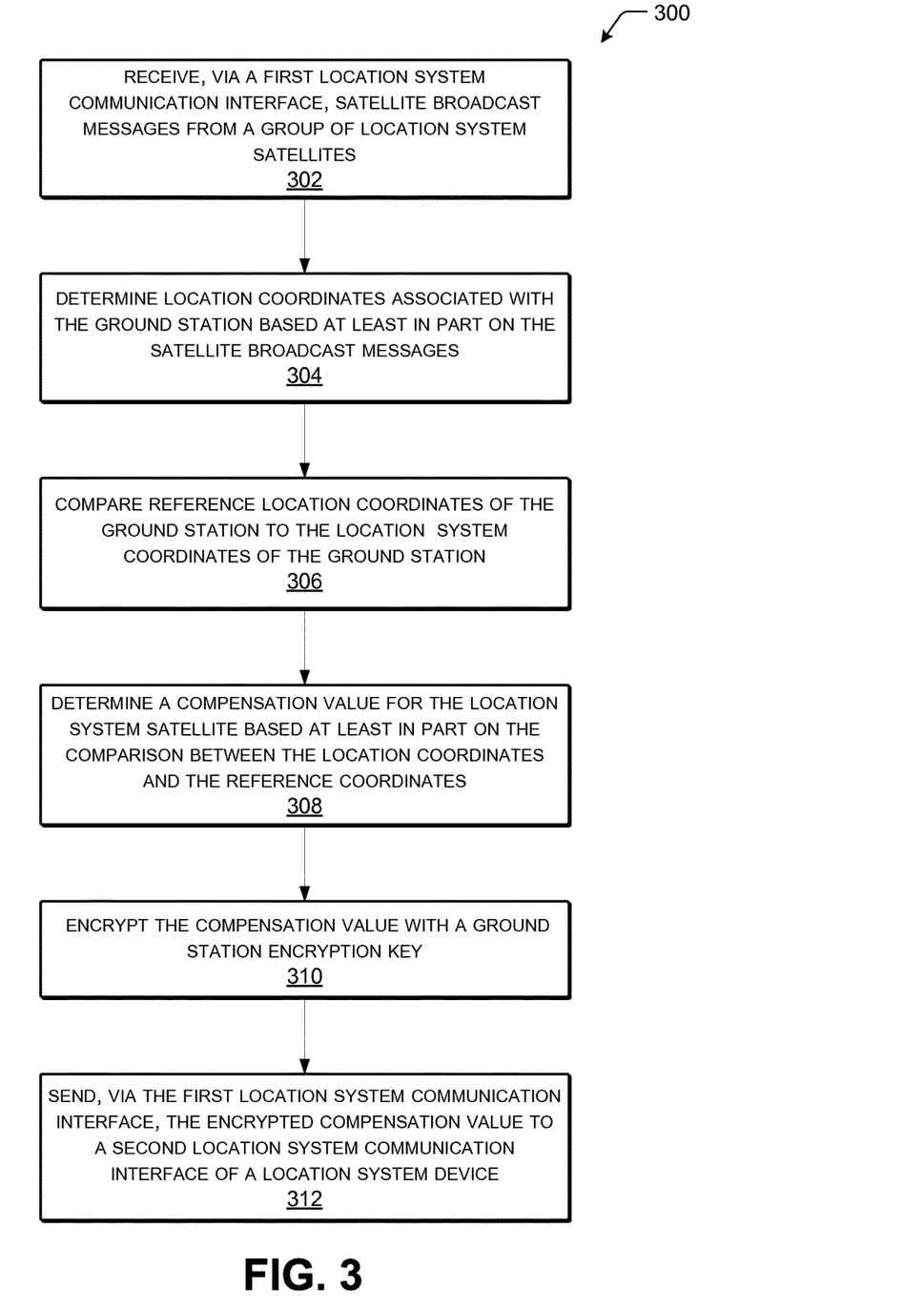
FIG. 3 is a flow diagram illustrating an example process for determining a compensation value for a plurality of location system satellites according to some implementations.

FIG. 3 illustrates a process 300 for determining a compensation value by a ground station within a location system according to some implementations. The process 300 is illustrated as a collection of blocks in a logical flow graph, which represent a sequence of operations that can be implemented in hardware, software, or a combination thereof. The blocks are referenced by numbers 302-312. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations is described is not intended to be construed as a limitation, and any number of the described blocks can be combined in any order and/or in parallel to implement the process.

At 302, the ground station may receive, via a first location system communication interface, satellite broadcast messages from a group of location system satellites. For example, the communication interface 212 may receive satellite broadcast signals 110 from the location system satellites 102. In some instances, the communication interface 212 may include a GPS receiver, and the satellite broadcast signals 110 may include GPS satellite broadcast signals.

At 304, the ground station may determine location system coordinates associated with the ground station based at least in part on the satellite broadcast messages. For example, the location system client 214 may determine location system coordinates 112 based upon the satellites parameters 206. In some instances, the satellite parameters 206 may include a pseudorandom code that identifies the satellite, and a message including the time of transmission associated with the pseudorandom code and the current position of the satellite. In some examples, the location system client 214 may determine a latitudinal value, a longitudinal value, and an altitudinal value associated with the ground station 104 based at least in part on satellite parameters 206 included in GPS satellite broadcast signals 110.

At 306, the ground station may compare reference location coordinates of the ground station to the location system coordinates of the ground station. For example, the error detection module 216 may compare the location system coordinates 112 to the fixed coordinates 114. In some instances, the error detection module 216 may compare a fixed latitudinal value, a fixed longitudinal value, and a fixed altitudinal value associated with the ground station 104 to a latitudinal value, a longitudinal value, and an altitudinal value determined based at least in part on the satellite parameters 206.

At 308, the ground station may determine a compensation value for the location system satellite based at least in part on the comparison between the location coordinates and the reference coordinates. For example, the error detection module 216 may determine the compensation value 116 by computing the difference between the location system coordinates 112 and the fixed location coordinates 114. Further, the error detection module 216 may store, to the compensation history 224, a mapping of the compensation value 116 to the set of satellites 102 that provided the satellites signals 110 used to determine the compensation value 116.

At 310, the ground station may encrypt the compensation value with a ground station encryption key. For example, the encryption module 220 may encrypt the compensation value 116 using a ground station encryption key. In some other examples, the encryption module may generate at message authentication code for the compensation value 116.

At 312, the ground station may send, via the first location system communication interface, the encrypted compensation value to a second location system communication interface of a location system device. For example, the communication interface 212 may send compensation information 228 to the location system device 202. The compensation information 228 may include the compensation value 116, an identifier of the ground station, a location of the ground station 104, the date and time of calculation of the compensation value 116, a time of transmission of the compensation information 228, and identifiers of the location system satellites 102 associated with the compensation value 116.

Figure 4:
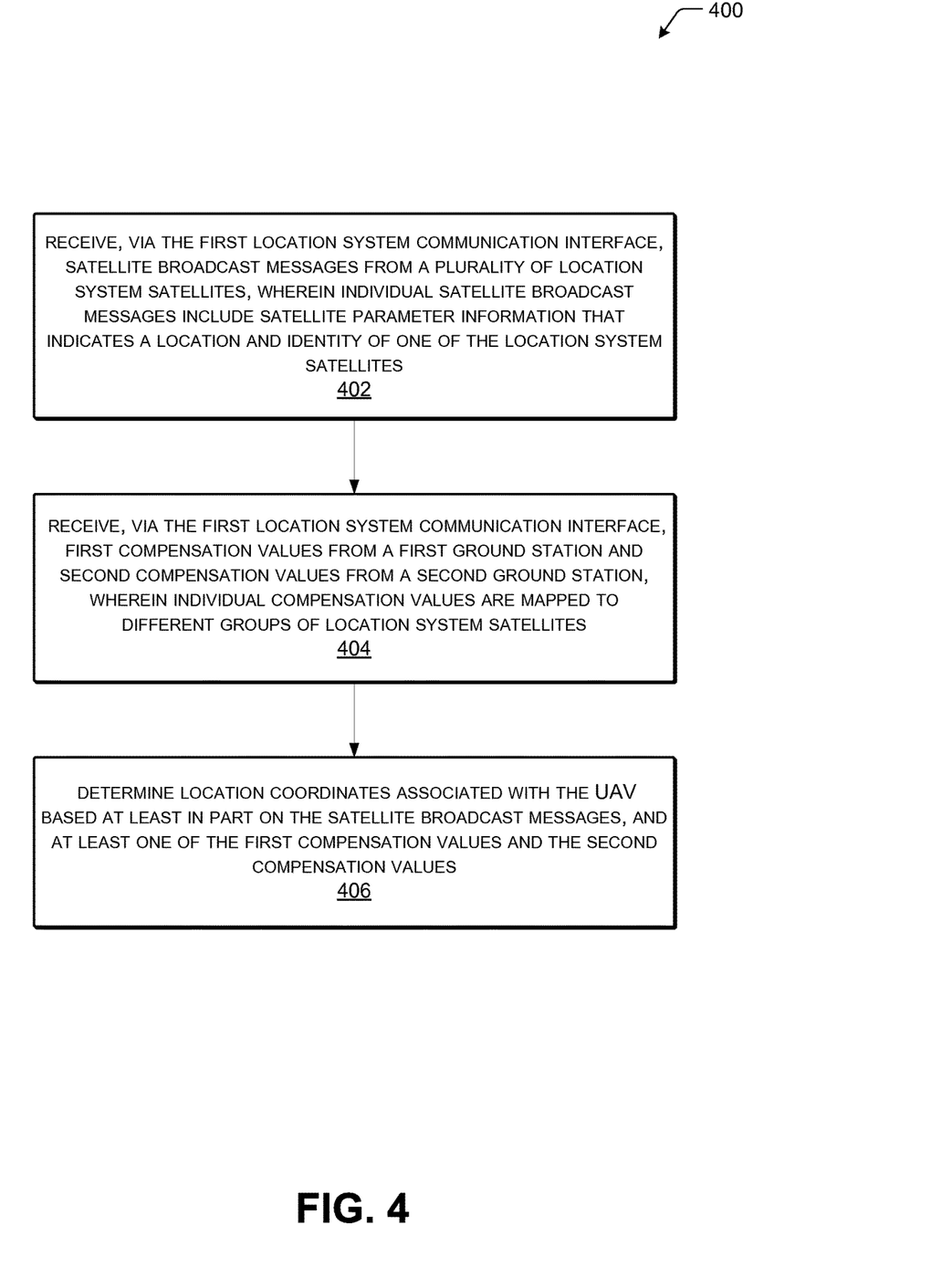
FIG. 4 is a flow diagram illustrating an example process for correcting location system coordinates using a compensation value according to some implementations.

FIG. 4 illustrates a process 400 for correcting an error in system location coordinates by a location system device within a location system according to some implementations. The process 400 is illustrated as a collection of blocks in a logical flow graph, which represent a sequence of operations that can be implemented in hardware, software, or a combination thereof. The blocks are referenced by numbers 402-406. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations is described is not intended to be construed as a limitation, and any number of the described blocks can be combined in any order and/or in parallel to implement the process.

At 402, the location system device may receive, via the first location system communication interface, satellite broadcast messages from a plurality of location system satellites, wherein individual satellite broadcast messages include satellite parameter information that indicates a location and identity of one of the location system satellites. For example, the communication interface 236 may receive satellite broadcast signals 110 from location system satellites 102. In some instances, the communication interface 212 may include a GPS receiver, and receive GPS satellite broadcast signals 110 from the location system satellites 102.

At 404, the location system device may receive, via the first location system communication interface, first compensation values from a first ground station and second compensation values from a second ground station, wherein individual compensation values are mapped to different groups of location system satellites. For example, the communication interface 236 may receive a group of compensation values 116(1) from a first ground station 104(1), and second group of compensation values 116(2) from a second ground station 104(2). Further, each compensation value 116 may be mapped to a group of location system satellites 102.

At 406, the location system device may determine location coordinates based at least in part on the satellite broadcast messages, and at least one of the first compensation values and the second compensation values. For example, the location system client 238 may determine location system coordinates 252 based at least in part on the satellite signals 110 received by the communication interface 236. Further, the error correction module 242 may identify the group of location system satellites 102 associated with the satellite signals 110 received by the communication interface 236, and identify a compensation value 116 mapped to the identified group of satellites 102. In addition, the error correction module 242 may use the location system coordinates 252 and the identified compensation value 116 to determine the corrected location system coordinates 254.

In some examples, the error correction module 242 may select a compensation value 116, and identify the plurality of satellites 102 associated with the compensation value 116. Further, the location system client 238 may determine location system coordinates 252 based at least in part on satellite broadcast signals 110 received from the identified plurality of location system satellites. In addition, the error correction module 242 may use the location system coordinates 252 and the selected compensation value 116 to determine the corrected location system coordinates 254.

In some other examples, the location system client 238 may determine location system coordinates 252 including a latitudinal value, a longitudinal value, and an altitudinal value associated with the location system device 202 based at least in part on GPS satellite broadcast signals 110 received by the communication interface 236. Further, the error correction module 242 may adjust a latitudinal value, a longitudinal value, and an altitudinal value based at least in part on a compensation value 116 to determine the corrected location system coordinates 254.

In yet another example, the error correction module 242 may compute corrected location system coordinates 254 based at least in part on an average of a plurality of compensation values 116 received from a plurality of ground stations 104. For instance, the error correction module 242 may adjust a latitudinal value, a longitudinal value, and an altitudinal value based at least in part on an average of a plurality of compensation values 116 to determine the corrected location system coordinates 254. Additionally, and alternatively, the error correction module 242 may compute a plurality of corrected location system coordinates 254 based at least in part on an average of a plurality of corrected location system coordinates 254 to determine averaged corrected location system coordinates.

Figure 5:
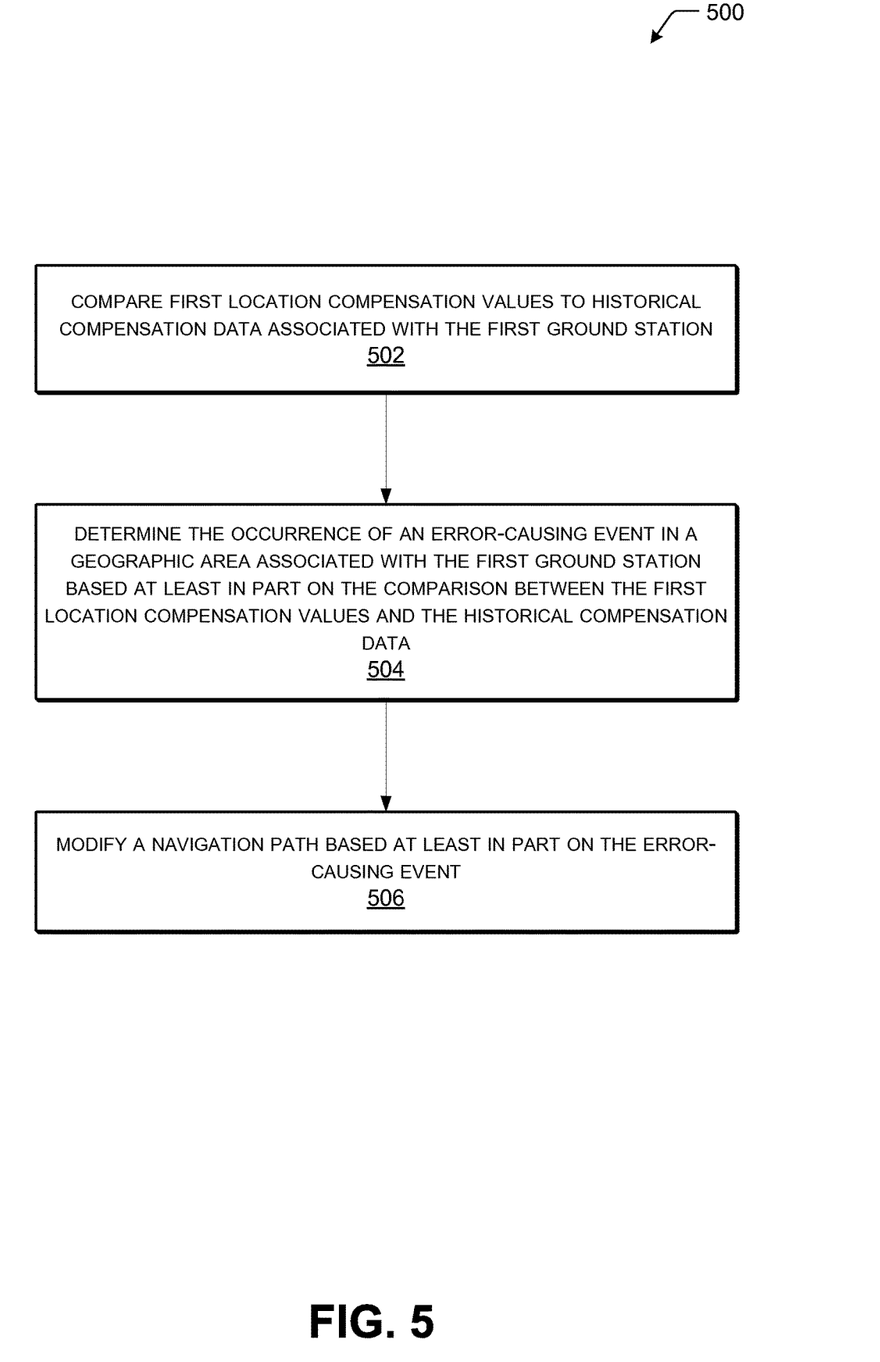
FIG. 5 is a flow diagram illustrating an example process for detecting an event within the satellite location system based on compensation values according to some implementations.

FIG. 5 illustrates a process 500 for detecting an error-causing event in a location system by a UAV according to some implementations. The process 500 is illustrated as a collection of blocks in a logical flow graph, which represent a sequence of operations that can be implemented in hardware, software, or a combination thereof. The blocks are referenced by numbers 502-506. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations is described is not intended to be construed as a limitation, and any number of the described blocks can be combined in any order and/or in parallel to implement the process.

At 502, the UAV may compare first location compensation values to historical compensation data associated with the first ground station. For example, the event determination module 248 may compare compensation values 116 received from a ground station to compensation history 250.

At 504, the UAV may determine the occurrence of an error-causing event in a geographic area associated with the first ground station based at least in part on the comparison between the first location compensation values and the historical compensation data. For instance, the event determination module 248 may identify at least one of weather event, natural/artificial interference within a geographic area, and/or satellite 102 clock drift based at least in part on a relationship between the compensation value 116 and historical compensation values collected in the compensation history 250.

At 506, the UAV may modify a navigation path based at least in part on the error-causing event. For example, the event determination module 248 may instruct the navigation module 240 to avoid the geographical area based in part on the error-causing event. In some other examples, the event determination module 248 may instruct the ranking module 244 to apply lower confidence values to ground stations 104 and/or satellites 102 affected by the error-causing event.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, methods, and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

What is claimed is:

1. A location system ground station comprising:
   one or more processors;
   a first location system communication interface;
   one or more computer-readable media including a ground station identifier and first location coordinates, wherein the first location coordinates include fixed coordinates associated with the location system ground station; and
   processor-executable instructions maintained on the one or more computer-readable media which, when executed by the one or more processors, program the one or more processors to:
   receive, via the first location system communication interface, a first satellite broadcast message from a first location system satellite of a plurality of location system satellites;

receive, via the first location system communication interface, a second satellite broadcast message from a second location system satellite of the plurality of location system satellites;
receive, via the first location system communication interface, a third satellite broadcast message from a third location system satellite of the plurality of location system satellites;
determine second location coordinates associated with the location system ground station based at least in part on the first satellite broadcast message and the second satellite broadcast message;
determine a first compensation value for the first location system satellite and the second location system satellite based at least in part on the first location coordinates and the second location coordinates;
determine third location coordinates associated with the location system ground station based at least in part on the first satellite broadcast message and the third satellite broadcast message;
determine a second compensation value for the first location system satellite and the third location system satellite based at least in part on the first location coordinates and the third location coordinates;
determine that the first compensation value is less than the second compensation value; and
send, via the first location system communication interface, compensation information to a second location system communication interface of a location system device, the compensation information including at least the first compensation value based at least in part on the first compensation value being less than the second compensation value, a first identifier associated with the first location system satellite, and a second identifier associated with the second location system satellite.

2. The location system ground station of claim 1, wherein determining the first compensation value is based at least in part on determining a difference between the first location coordinates and the second location coordinates.

3. The location system ground station of claim 1, wherein the one or more processors are further programmed to:
determine a confidence value corresponding to a positional accuracy of at least the first location system satellite based at least in part on the first compensation value; and
send, via the first location system communication interface, the confidence value to the second location system communication interface of the location system device.

4. The location system ground station of claim 1, wherein the one or more processors are further programmed to:
compare the first compensation value to historical compensation data associated with at least the first location system satellite;
determine an occurrence of a weather event based at least in part on comparing the first compensation value to the historical compensation data; and
send a notification of the weather event to the second location system communication interface of the location system device.

5. The location system ground station of claim 1, wherein:
the first location coordinates include at least one of a first longitudinal value, a first latitudinal value, or a first altitudinal value; and
the second location coordinates include at least one of a second longitudinal value, a second latitudinal value, or a second altitudinal value.

6. A method comprising:
receiving a first satellite broadcast message from a first location system satellite of a plurality of location system satellites;
receiving a second satellite broadcast message from a second location system satellite of the plurality of location system satellites;
receiving a third satellite broadcast message from a third location system satellite of the plurality of location system satellites;
determining first location coordinates associated with a ground station based at least in part on the first satellite broadcast message and the second satellite broadcast message;
determining a first compensation value for the first location system satellite and the second location system satellite based at least in part on the first location coordinates and second location coordinates associated with the ground station;
determining third location coordinates associated with the ground station based at least in part on the first satellite broadcast message and the third satellite broadcast message;
determining a second compensation value for the first location system satellite and the third location system satellite based at least in part on the third location coordinates and the second location coordinates;
determining that the first compensation value is less than the second compensation value; and
sending compensation information to a location system device, the compensation information including the first compensation value based at least in part on the first compensation value being less than the second compensation value, a first identifier associated with the first location system satellite, and a second identifier associated with the second location system satellite.

7. The method of claim 3, wherein determining the first compensation value is based at least in part on determining a difference between the first location coordinates and the second location coordinates.

8. The method of claim 3, further comprising:
determining a confidence value corresponding to a positional accuracy of at least the first location system satellite based at least in part on the first compensation value; and
sending the confidence value to the location system device.

9. The method of claim 3, further comprising:
comparing the first compensation value to historical compensation data associated with at least the first location system satellite;
determining an occurrence of a weather event based at least in part on comparing the first compensation value to the historical compensation data; and
sending a notification of the weather event to the location system device.

10. The method of claim 3, wherein:
the first location coordinates include at least one of a first longitudinal value, a first latitudinal value, or a first altitudinal value; and
the second location coordinates include at least one of a second longitudinal value, a second latitudinal value, or a second altitudinal value.

11. The method of claim 3, further comprising storing the second location coordinates, wherein the second location coordinates include fixed coordinates associated with the ground station.

12. A system comprising:
one or more processors; and
one or more computer-readable media storing instructions that, when executed by the one or more processors, cause the one or more processors to perform operations comprising:
receiving a first satellite broadcast message from a first location system satellite of a plurality of location system satellites;
receiving a second satellite broadcast message from a second location system satellite of the plurality of location system satellites;
receiving a third satellite broadcast message from a third location system satellite of the plurality of location system satellites;
receiving a fourth satellite broadcast message from a fourth location system satellite of the plurality of location system satellites;
determining first location coordinates associated with the system based at least in part on the first satellite broadcast message and the second satellite broadcast message;
determining a first compensation value for the first location system satellite and the second location system satellite based at least in part on the first location coordinates and second location coordinates associated with the system;
determining third location coordinates associated with the system based at least in part on the third satellite broadcast message and the fourth satellite broadcast message;
determining a second compensation value for the third location system satellite and the fourth location system satellite based at least in part on the third location coordinates and the second location coordinates; and
sending compensation information to a location system device, the compensation information including the first compensation value based at least in part on the first compensation value being less than the second compensation value, a first identifier associated with the first location system satellite, and a second identifier associated with the second location system satellite.

13. The system of claim 12, wherein determining the first compensation value is based at least in part on determining a difference between the first location coordinates and the second location coordinates.

14. The system of claim 12, the operations further comprising:
determining a confidence value corresponding to a positional accuracy of at least the first location system satellite based at least in part on the first compensation value; and
sending the confidence value to the location system device.

15. The system of claim 12, the operations further comprising:
comparing the first compensation value to historical compensation data associated with at least the first location system satellite;
determining an occurrence of a weather event based at least in part on comparing the first compensation value to the historical compensation data; and
sending a notification of the weather event to the location system device.

16. The system of claim 12, wherein:
the first location coordinates include at least one of a first longitudinal value, a first latitudinal value, or a first altitudinal value; and
the second location coordinates include at least one of a second longitudinal value, a second latitudinal value, or a second altitudinal value.

17. The system of claim 12, the operations further comprising storing the second location coordinates, wherein the second location coordinates include fixed coordinates associated with the system.

18. The location system ground station of claim 1, wherein the one or more processors are further programmed to:
determine a first confidence value associated with at least the first location system satellite based at least in part on the first compensation value;
determine a second confidence value associated with at least the third location system satellite based at least in part on the second compensation value; and
determine that the first confidence value is greater than the second confidence value based at least in part on the first compensation value being greater than the second compensation value.

19. The location system ground station of claim 1, wherein the compensation information further includes first location coordinates associated with the location system ground station.

20. The location system ground station of claim 1, wherein the compensation information further includes a message authentication code that the location system device can use to authenticate the location system ground station.

* * * * *